June 9, 1931.  D. C. KELLOGG  1,808,987
FLUID OPERATED FOUR-WHEEL BRAKING SYSTEM FOR LAND VEHICLES
Filed May 23, 1924  2 Sheets-Sheet 1

Inventor,
D. C. Kellogg.
By John S. Barker
Attorney

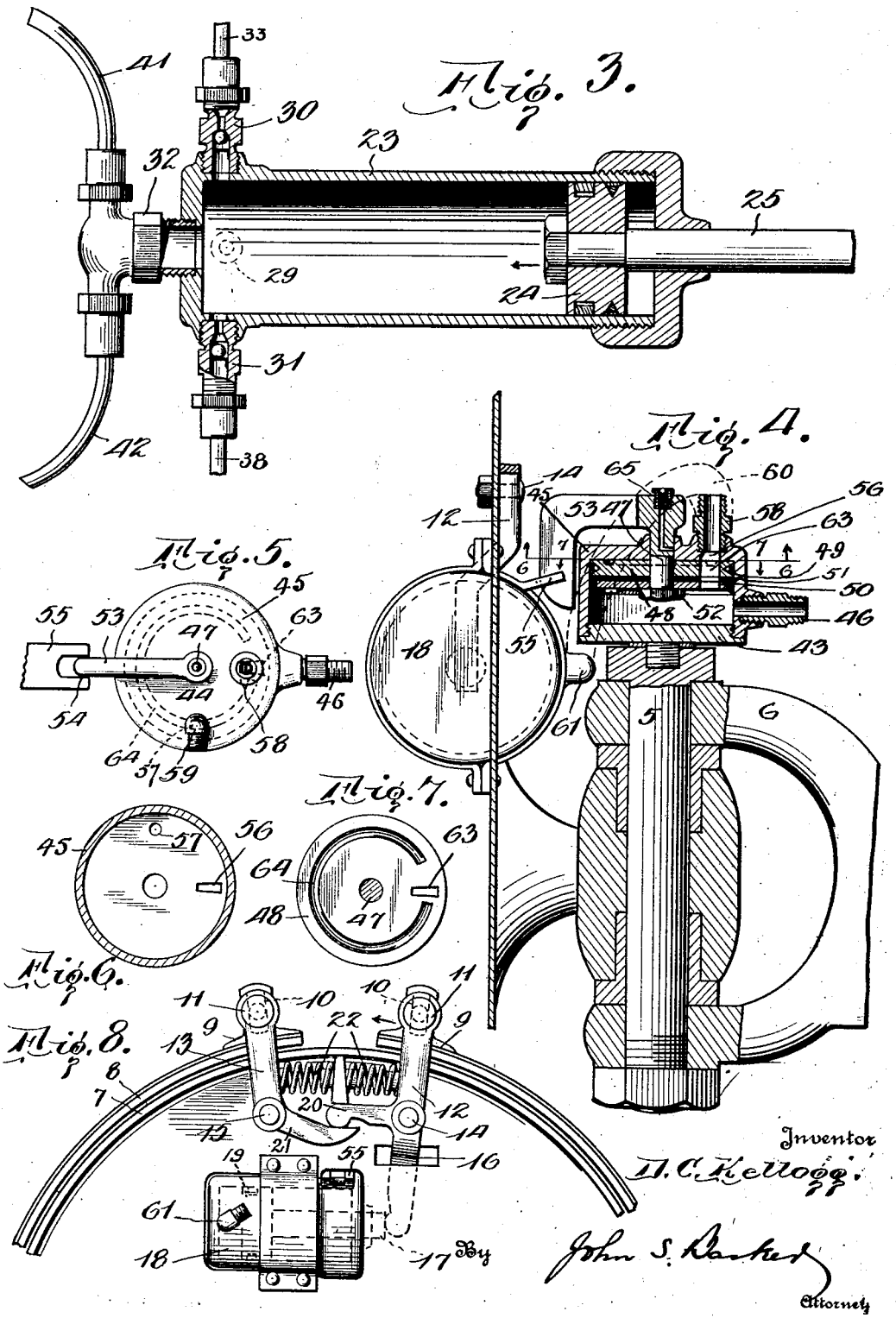

Patented June 9, 1931

1,808,987

UNITED STATES PATENT OFFICE

DWIGHT C. KELLOGG, OF CARTHAGE, MISSOURI

FLUID-OPERATED FOUR WHEEL BRAKING SYSTEM FOR LAND VEHICLES

Application filed May 23, 1924. Serial No. 715,445.

My invention relates to a fluid-operated four-wheel braking system for vehicles in which provision is made for applying the brakes simultaneously and equally to the four wheels at the pleasure of the operator, so long as the front, steering, ground wheels are in line with the rear wheels; but when a sharp turn is made in the steering of the vehicle the power that applies the brakes to front wheels is disconnected and these wheels are then left free to turn. It is well known that whenever a sharp turn is made in operating a motor-driven car the front wheels should be left to turn freely in order that the vehicle may be steered and that danger of skidding be reduced to a minimum, and my invention has for one of its objects to insure in a four-wheel braking system that under all circumstances the front wheels shall be left free to revolve and to guide the car when a sharp turn is being made.

In the drawings—

Fig. 3 is a longitudinal sectional view of the pressure controlling cylinder and associated parts of the system.

Fig. 4 is a vertical sectional view of one of the valves and immediately associated parts for automatically releasing a steering wheel of the vehicle when a turn is being made.

Fig. 5 is a top plan view of the valve shown in Fig. 4.

Fig. 6 is a vertical sectional view taken on the line 6—6 of Fig. 4 looking in the direction of the arrow or upwardly.

Fig. 7 is a top plan view of the plate 48 within the valve, the view being taken on the section line 7—7 of Fig. 4.

Fig. 8 is a detail broken view of one of the brake cylinders and connections through which it operates to apply the brake.

Figure 1:
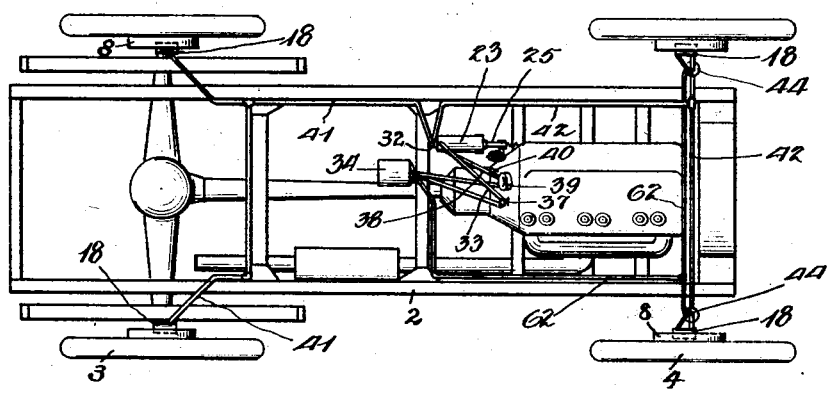
Figure 1 is a diagrammatic plan view of the chassis of an automobile to which my invention is applied.

The chassis of the vehicle may be of any usual or preferred construction and is designated, in the accompanying drawings, by the reference character 2. It is provided with rear wheels 3 and front wheels 4, the latter being supported upon stub axles for steering purposes, as is usual. The upright spindles of the stub axles for the front, steering, wheels, are designated 5, and these are supported in suitable bearings at the ends of the front axle 6. Each of the four wheels is provided with a brake drum 7 with which engages a brake band 8. I represent the brake band as being external to the brake drum, but my invention is equally as applicable to an internal, expansible brake as to the form represented in the drawings. The brake band 8 represented in the drawings nearly encircles the brake drum and has secured to its opposite ends the brackets 9, which are radially slotted, at 10, to receive the flat-sided stems or shanks of pins 11 that are seated in the outer ends of levers 12, 13, that are suitably mounted upon fixed pins 14, 15. One of the levers, 12, is formed with an extension 16 located in position to be engaged by the piston rod 17 that extends out from a brake cylinder 18. Within this cylinder and secured to the rod 17 is a piston 19, provided with suitable piston rings or other form of packing, which, while being free to move within the cylinder, shall have fluid-tight engagement with the inner walls thereof.

The lever 12 is also provided with an arm 20 that is adapted to engage with an arm 21 of the lever 13, the arrangement of these levers being such that upon the piston rod 17 being forced outwardly and into engagement with the extension 16 of the lever 12, the latter is rocked and moves the bracket 9 with which it is connected in the direction of the arrow represented in Fig. 8. At the same time a movement of the lever 12 causes its arm 20 to engage with the arm 21 of the lever 13, and this causes the latter to turn and move the bracket with which it is connected so as to cause the brake band to be contracted and applied to the brake drum, the two levers thus operating together to effect this. Springs 22 bear against the levers 12 and 13, and serve to release the brake and cause the parts thereof to assume their normal positions, as indicated in Fig. 8. By slotting the brackets 9 and supporting the pins 11 that unite such brackets and their operating levers so they are free to move radially in the said slots, as the brake band is contracted and expanded, I insure that the brake shall properly function without liability of any of its parts binding or sticking.

Figure 2:
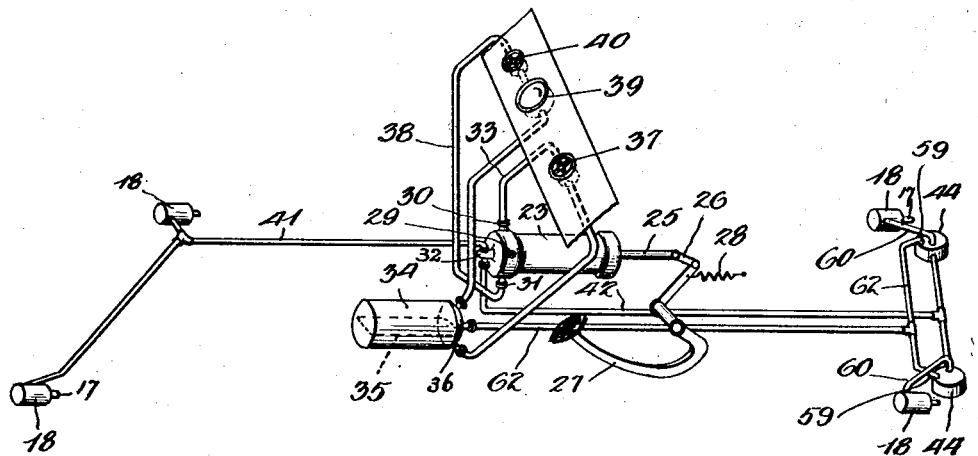
Fig. 2 is a diagrammatic view illustrating the fluid connections and the main operating parts employed in the brake system which I have devised.

23 indicates a pump and pressure controlling device conveniently supported on the chassis so that it may be easily manipulated by the driver of the vehicle. It comprises a cylinder in which is fitted a piston 24 secured to a piston rod 25 that is connected by a link 26 with a foot lever 27. A spring 28 connected with the lever 27 operates to hold the moving parts of the pressure controlling device in normal position, such as indicated in Fig. 2. The piston 24 is provided with suitable packing rings, and the end of the cylinder through which extends the rod 25 is formed with a gland or other form of rod packing to insure a tight joint.

At the end of the cylinder 23 opposite that through which extends the piston rod 25 there are several fluid passages. Into one of these is inserted a valve 29 opening inwardly and communicating with the atmospheric air, it serving to permit, under certain conditions, the free entrance of air into the cylinder 23, but otherwise remaining closed. Another opening into the cylinder 23 is provided with a valved coupling 30, the valve of this coupling opening inwardly. A second valved coupling 31 is provided for a third opening into the cylinder 23, the valve of this coupling opening outwardly. A fourth opening into the cylinder is provided with a T-shaped coupling 32, the passages through which are free, that is to say, they are not valved.

The coupling 30 is connected by a tube or fluid conduit 33 with a tank 34 adapted to be partially filled with a liquid, 35, that serves as the medium by means of which the several brakes are operated. The connection of the tube 33 with storage tank 34 is well below the liquid level 35, as indicated at 36. This tube is provided with a cut-off valve 37 that is located so as to be conveniently operated by the occupant of the vehicle, as for instance, upon the dash or instrument board of the car. The coupling 31 is connected by a tube or conduit 38 with the tank 34 at a point well above the level of the liquid 35 in the tank. This tube is provided with a cut-off valve 40 adapted to be controlled by the user of the vehicle, and a pressure gage 39, the valve and pressure gage being preferably mounted upon the instrument board of the vehicle. To one arm of the coupling 32 is connected a tube or fluid conduit 41 leading to the brake cylinders 18 for the rear wheels; while the opposite arm of the T-coupling has connected with it a tube 42 leading to the operating means for the brakes of the front wheels. The fluid conduit 42 leads to a valve 44 connected with the spindle 5 of one of the supporting, front, steering wheels 4.

The connection between the pressure control cylinder 23 and the brake-operating cylinders 18 for the rear wheels always remains open, so that whenever pressure within the cylinder is increased above the normal pressure of the system the rear brakes are applied. On the other hand, the valve 44 is arranged to intercept the connection between the pressure-control cylinder 23 and the brake cylinders 18 for the front wheels whenever the front, steering, wheels are turned beyond a determined degree; but when these wheels are in line with the rear wheels or turned but little, free connection between the pressure cylinder 23 and the front brake cylinders 18 is maintained.

The valve 44 comprises a base plate 43 that is secured to the end of the spindle 5 for the stub axle, and a cylindrical casing 45. There is an inlet opening into the lower portion of the casing 45 in which is seated the coupling 46 to which is connected the fluid conduit 42. An axial spindle 47 extends through the top of the valve casing 45 and has secured to it within the valve a plate 48, the peripheral edge of which fits the casing and is provided with a packing 49 that renders this fit fluid tight. Below the plate 48 and held against the under face thereof by a plate 51 is a leather packing 50 of the type ordinarily employed in hand water pumps. A nut 52 holds the parts 48, 50 and 51 together and securely upon the spindle 47. This spindle is free to turn in its bearing in the end plate of the valve casing and is provided with a laterally extending arm 53 that lies in a recess 54 formed in an arm 55 secured to some turning part connected with the steering wheel 4.

It will be seen, from the foregoing description, that the plate 48 turns with the turning of the steering wheels, while the valve casing 45 is held against rotative movement.

Provision is made at 65 for lubricating the spindle 47 that passes through the top wall of the valve casing, this being important as this spindle is constantly turning in its bearing whenever the car is being driven.

There are two openings, 56 and 57, for the passage of the brake-operating and controlling fluid through the top of the casing, and into these openings are fitted couplings 58, 59. A flexible tube or conduit 60 unites the coupling 58 with a coupling 61 of the brake cylinder 18 while another flexible tube 62 connects the coupling 59 with the storage tank 34.

Through the plate 48 there is formed an opening 63 that is adapted to register with the opening 56 through the top of the valve casing 45 when the front wheels of the vehicle are in line with the rear wheels, the openings 56 and 63 being of such size that whenever the steering wheels 4 are turned beyond a certain degree these apertures cease to register with each other and hence communication between the interior of the valve 44 and the brake cylinder is cut off.

In the upper face of the plate 48 there is formed a groove 64 which is preferably concentric with the plate and is of such size and length that its respective ends are located a short distance on either side of the opening 63, as represented in Fig. 7. This groove communicates with the opening 57 through the top of the valve casing at all times.

It is apparent that whenever the front, steering, wheels 4 are turned so as to cut off communication between the openings 56 and 63 there is thereupon established a communication between the groove 64 and the opening 56. This puts the brake cylinder into communication with the storage tank 34 through the following conduit, namely, coupling 61, flexible tube 60, coupling 58, opening through the cover of the valve casing, 56, groove 64 in the plate 48, opening 57 through the top plate of the valve casing, coupling 59, and tube or conduit 62 leading to the tank, with the result that the pressure in the brake cylinder is instantly reduced to the normal pressure of the entire system, and any excess liquid in the connections between the brake cylinder and the storage tank that may be caused to move by the brake piston 18 resuming normal position, is returned to the central storage tank 34.

The details of the arrangement of the several parts that have been described and the manner in which they are supported upon the chassis of the vehicle have not been illustrated in the accompanying drawings, since I consider these as features of mechanical arrangement rather than a part of my invention.

I have represented two valves 44, one carried by the upright spindle 5 of each stub axle for the steering, ground, wheels of the vehicle. The tubular connection 42 from the pressure-controlling cylinder 23 through which the motor fluid passes to these valves, is represented as dividing, a branch leading to each valve, and there being a tubular connection, 60, from each valve to each front brake cylinder 18.

The operation of the apparatus is as follows: A suitable liquid, which should be of non-freezing character whenever the invention is being used in cold weather, is introduced into the tank 34 in sufficient quantity to fill the several conduits, the brake cylinders 18 and the storage tank, to about the level indicated by dotted lines in Fig. 2. The operator now closes the valve 37 in the conduit 33 and opens the valve 40 in the conduit 38, and operates the piston 24 in the cylinder 23. The piston 24 and cylinder 23 and associated parts now operate as an air pump, taking in atmospheric air through the valve 29 and discharging it through the valved coupling 31 and the conduit 38 into the tank 34. When the pressure within the tank is raised to the proper degree, as indicated by the gage 39, the valve 40 is closed and the valve 37 in the conduit 33 opened. This will cause the pressure to be equalized throughout the entire system and the cylinder 23 behind the piston 24 to be filled with liquid from the storage tank.

The normal pressure throughout the system should be such that while permitting the several brakes, under action of the springs 22, to clear their drums, very little additional pressure will be required to set the brakes. In other words, the pressure of motor fluid in the brake operating system is nearly sufficient to balance the pressure of the springs 22. The system when thus adjusted is ready for use. If now pressure be applied to the foot lever 27 and the piston 34 be moved in the direction of the arrow, Fig. 3, pressure upon that body of fluid confined within the system between the piston 24 in the pressure-regulating cylinder and the several pistons 19 in the brake cylinders 18, will be instantly increased and the several brakes will be set with a degree of force depending upon the pressure applied to the piston 24, and this will be maintained so long as this pressure is continued, except perchance as to the front wheels, as will be presently described. But there will be no increase of pressure at the storage tank 34, because the check valve in the coupling 30 automatically cuts off communication between the cylinder 23 and the tank through the conduit 33, while the manually operated valve 40 which has been closed cuts off communication with the tank through the conduit 38. It has already been herein pointed out that it is highly undesirable and dangerous to apply the brakes to the front wheels when the vehicle is making a short turn, and it has also been described how through the action of the valve or valves 44 the connection between the pressure cylinder 23 and the brake cylinders for the front brakes is automatically cut off whenever the front wheels are turned beyond a determined degree.

It, therefore, need only be pointed out that when the front wheels are turned so as to cut off communication between the openings 56 and 63 at the valve 44, power to operate the brakes is cut off, and simultaneously, or very shortly thereafter, there is established a connection between the front brake cylinders 18 and the storage tank, and when this latter connection is established the pressure in the front brake cylinders 18 instantly falls to the normal pressure of the system and the springs 22 release the brakes, leaving the front wheels free to revolve and serve their function in directing the vehicle.

It is well known that when a vehicle equipped with brakes for the front or steering wheels is making a turn it is of primary importance that the brake for the front wheel which is on the outside of the turn should be promptly released. The other brake may be maintained in retarding engagement with its wheel for a time after the brake on the outside wheel has been released without serious danger of the vehicle skidding. I therefore preferably arrange the port of opening 63 through the plate 48 nearer to one end of the groove 64 than to the other, as represented in Fig. 7, the arrangement in each valve 44 being such that the release of the pressure on the brake cylinder of the outer wheel takes place quickly and at a time appreciably prior to the release of the brake for the inner wheel. Thus when a wide turn is being made it may be that only the outer wheel will be released and left to run free while braking pressure is maintained on the inner wheel, but whenever a sharp turn is made then both front wheels are relieved from brake pressure.

I have represented but a single embodiment of my invention, in which the several motor elements for operating the brakes for the individual wheels are fluid-operated, but do not wish thereby to be understood as limiting myself in the useful applications of the invention to the specific apparatus which I have shown and described, nor beyond what is indicated by the following claims.

What I claim is:

1. The combination with a land vehicle having four wheels, the front pair being free to be turned for steering purposes, of a brake for each wheel, motor elements for applying the brakes, control means for simultaneously directing power to the motor elements for applying the brakes, and means for automatically releasing the brakes for both the front wheels whenever the latter are turned beyond a determined degree, the release of such brakes being in sequence, that of the wheel describing the larger circle taking place first.

2. The combination with a land vehicle having four wheels, the front pair being free to be turned for steering purposes, of a brake for each wheel, motor elements for applying the brakes, control means for simultaneously directing power to the motor elements to apply the brakes, and independent means for automatically cutting off the power that operates the brakes for the front wheels and releasing said brakes whenever these wheels are turned beyond a determined degree, such means comprising an individual automatically and independently operating device for each brake these being arranged to operate the brakes in sequence, the brake of the wheel describing the larger circle being released in advance of the other.

3. The combination with the front steering wheel of a land vehicle and a brake therefor, of a fluid pressure motor element for operating the brake, a valve for controlling the flow of motor fluid to the said motor element, and connections for operating the valve as the wheel is turned for steering purposes, the valve being arranged to cut off the motor fluid and to release the brake when the wheel is turned beyond a predetermined degree in either direction, the said release and cut-off taking place at a less angular movement of the wheel when turning in one direction than when turning in the opposite direction.

4. The combination with the front steering wheel of a land vehicle and a brake therefor, of a fluid pressure motor element for operating the brake, a valve device for automatically releasing the brake mounted upon the pivot about which the wheel turns and means for operating the valve carried by a part that turns with the wheel.

5. In a brake for the pivot wheels of motor vehicles having steering knuckles, the combination with a brake drum, its band and band actuating mechanism turned in unison with the wheel when steering; of a ported member at the steering knuckle stationary relatively to the axle, having a fluid inlet port and an outlet port, fluid-actuated means for operating said band actuating mechanism including means turning in unison with the wheel when steering to control said ports.

6. In a brake for the pivot wheels of motor vehicles, the combination with a brake drum, its band and band actuating mechanism turned in unison with the wheel when steering; of a ported member having an inlet port and an outlet port, and fluid actuated means for operating said mechanism including means co-axial with the wheel pivot and turning in unison with the wheel when steering to control said ports, the angular relation of the ports to one another determining the release of fluid from said fluid-actuated means to automatically release the brake.

7. In a brake for the pivot wheels of motor vehicles, the combination with a brake drum, its band and band actuating mechanism; of a ported member stationary with the axle and co-axial with the wheel pivot, a valve also co-axial with the wheel pivot controlling said ports, and fluid-actuated means under the control of said ports and connected to the band-actuating mechanism.

8. In a brake for the pivot wheels of motor vehicles, the combination with a brake drum, its band and band actuating mechanism pivoting in unison with the wheel when steering; of a ported member stationary relatively to the wheel and having an inlet port and an outlet port, and fluid actuated means for operating said mechanism including means coaxial with the wheel pivot to control said ports, said ports and controlling means correlated to control the passage of fluid to and away from said fluid actuated means to actuate the brake through a large angle when the wheel pivots in one direction.

9. The combination with mechanism for applying a brake for a pivot wheel by fluid pressure; of means coaxial with the wheel pivot mechanically operated by the wheel upon pivoting of the wheel to control the fluid to the mechanism to cut off the supply and vent it after a predetermined pivotal movement of the wheel.

DWIGHT C. KELLOGG.